Jan. 7, 1936. A. B. McMAHAN 2,026,949
NEON TUBE SUPPORT
Filed Feb. 14, 1934
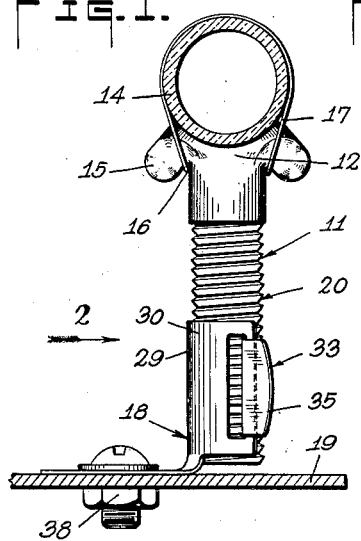
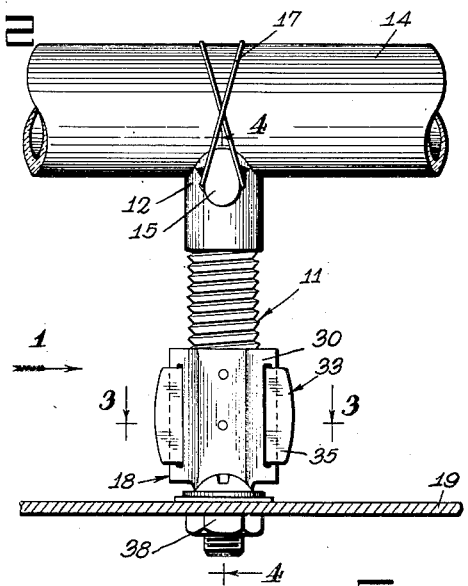
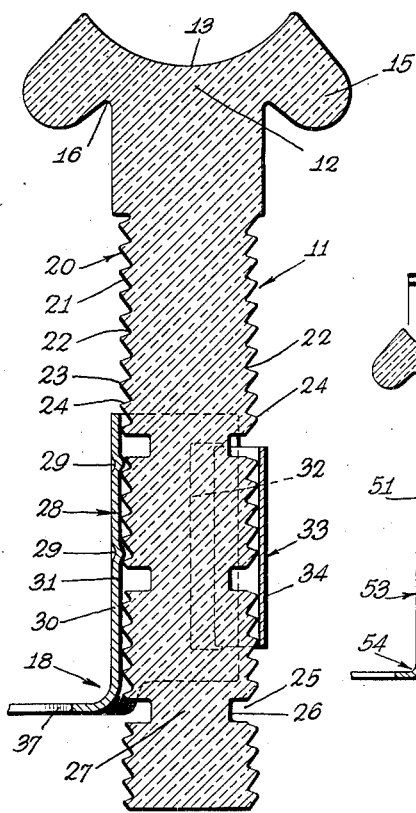
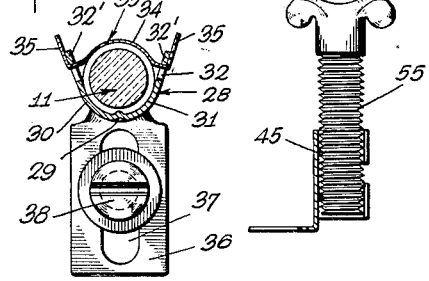
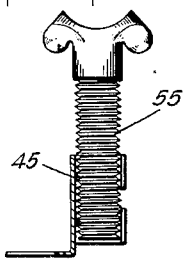
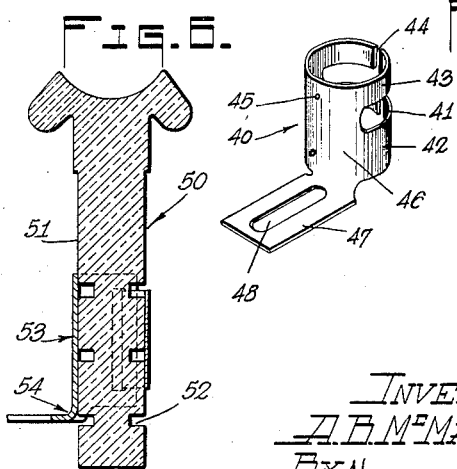
INVENTOR
A. B. McMAHAN
BY Hazard and Miller
ATTORNEYS Patented Jan. 7, 1936

2,026,949

UNITED STATES PATENT OFFICE 2,026,949

NEON TUBE SUPPORT

Arthur B. McMahan, Long Beach, Calif.

Application February 14, 1934, Serial No. 711,130

5 Claims. (Cl. 248—50)

My invention relates to a supporting device for neon tubes and relates particularly to the construction of the stem or spacing element for spacing the neon tube from the base or structure on which it is supported.

In a number of types of neon tube supports, a stem of insulating material such as glass is used, this having a head with a saddle to receive cylindrical neon tubes, and the glass stem having threads. These threads engage a clip or similar device which may be secured to the base. The clip is preferably provided with knubs or devices for engaging the thread so that the stem can be threaded downwardly or upwardly in the clip and thus make an accurate adjustment of the distance of the saddle and thus the neon tube from its base.

The threaded arrangement causes a rather slow adjustment, especially when assembling the stem in the clip, and heretofore in some of the prior types of stems, it has been the practice to have a longitudinal groove through which the knubs may pass when assembling or pushing the stem into the socket of the clip.

The main feature of my invention relates to a type of stem having threads thereon of such character that the longitudinal slot may be eliminated and the stem forced in or through the socket of the clip, the knubs riding over the thread, the socket portion having a sufficient resiliency to allow for the slight expansion, but the thread being of such shape that the stem cannot be pulled out as the knubs engage a shoulder on the stem. This permits a quick adjustment or assembly and also a fine adjustment by rotating the stem in the socket and even threading it in or out of the socket.

In this feature of my invention I preferably form the threads with a sufficiently gradual slope or wedging surface on the down face of the threads, that is, the slope being towards the end or point of the stem so that the knubs may readily slide or ride on this slope of the threads. The upper face of the threads, however, forms an abrupt shoulder substantially at right angles to the axis of the stem or at a very acute angle to transverse planes through the stem, the knubs engaging such shoulder preventing the pulling of the stem out of the socket.

Another feature of my invention is providing the glass stem with a plurality of spaced annular grooves of greater depth than the threads. These grooves are for the purpose of facilitating ready breaking of the stem by use of shears or suitable cutters which may engage in any one of the annular grooves.

As a further feature of my invention, in order that the stem may be threaded in the socket, I provide a plurality of knubs on the socket spaced vertically apart and these are so located that if one knub is in one of the annular grooves the other knub will engage the threads and thus the stem will always be threaded in a different groove of the socket.

Another feature of my invention comprises an improved new type of clip and may be considered as a detailed improvement on the spring clip patent to Lyle Mallette, No. 1,617,070, patented February 8, 1927.

My invention is illustrated in connection with the accompanying drawing, in which Fig. 1 is an elevation taken in the direction of the arrow 1 of Fig. 2 showing the new type of stem with one form of clip and attached to a base.

Fig. 2 is an elevation taken in the direction of the arrow 2 of Fig. 1.

Fig. 3 is a transverse section on the line 3—3 of Fig. 2 in the direction of the arrows.

Fig. 4 is a vertical section on the line 4—4 of Fig. 2 in the direction of the arrows, the neon tube, the base and a portion of the clip being omitted, the same being illustrated as forced into the clip preparatory to cutting or breaking off the end portion.

Fig. 5 is a perspective view of an alternative form of clip.

Fig. 6 is a section of a modified form of stem.

Fig. 7 is a vertical section of the clip of Fig. 5 showing a stem threaded therein.

In my invention, the stem 11 is illustrated as formed of an insulating material such as glass or porcelain. This is provided with a seat 12 having a saddle 13 formed on a curve to accommodate the curvature of the neon tube 14. The projecting knubs 15 form notches 16 for the fastenings 17 that hold the neon tube in place. The stem is secured in a clip 18 which is attached to a base 19.

In my invention I provide the stem with threads 20. These threads are of a particular type and shape having a downward sloping wedging surface 21 formed with rather a gradual slope considering the longitudinal axis of the stem, the root or bottom of the threads 22 are of the same depth and thus the same distance from the axial center of the stem as is also the apex 23 of the threads which are all of the same distance so that the device may be forced into a somewhat longitudinal socket in the clip. The threads have a shoulder surface 24 which forms a rather acute angle to the transverse plane through the axis of the stem, and as this stem is considered as being vertical, this shoulder may be substantially horizontal, if desired. Thus the threads on the stem each have a lower wedging surface or face 21 and a shoulder gripping face 24.

In addition to the threads there are a plurality of annular grooves 25, these being spaced longitudinally of the same, the base 26 of these grooves being of greater depth than the root of the threads, thus forming weakened neck portions 27. The grooves are preferably of sufficient width considered longitudinally of the same so that shearing blades may readily be inserted in the grooves and used to break the same into two parts, the broken off end being discarded in fitting the stems in the clips.

With this type of stem I use clips with a socket structure designated by the assembly numeral 28, and these sockets have a plurality of knubs 29 in vertical alignment and spaced apart. These knubs are so spaced that should one knub engage in one of the annular grooves 25, the other knub will engage a thread and thus both knubs cannot at the same time be in two grooves. This always allows threading of the stem in the socket either inwardly or outwardly.

In the manner of assembling and using the stem, on account of the sockets used with these threaded stems being resilient or expansible, the stem may be forced inwardly or downwardly, the knubs riding over the sliding or wedging faces of the threads, the socket having a slight expanding action to allow this; thus the stem may be thrust into the socket for approximately the correct distance for adjusting the neon tube then the stem may be rotated on its axis, the knubs functioning to thread the stem either inwardly or outwardly relative to the socket and the clip, and hence obtain an accurate adjustment of the stem and the clips. The surplus stem may be cut or broken off either before or after the fitting of the stem in the clip.

The type of clip shown in connection with Figs. 1 through 4 has the socket member made of a band 30 which is more than a semi-circle and has a cylindrical surface 31 with projecting ends 32, these ends being preferably tangent to the outside surface of the threads, that is, to the line of the apices 23. These ends have vertical slots 32 and through these slots there is a resilient strap 33. The strap band is indicated at 34 to conform to the cylindrical contour of the apices of the thread. The ends of the strap portions 35 are thrust through the slots 32 and bend parallel to the ends 32 of the main band portion 30 of the clip. This gives a substantial right angular bend at the end of the strap 33 but yet allows sufficient resiliency so that the socket may expand as the knubs 29 ride up the slopes 21 of the threads and over the apices of these threads. It will be seen, therefore, that as the knubs engage the shoulder portion 24 of the threads, the stem cannot be pulled out of its socket as this is too abrupt a surface to give a wedging action for expanding the socket. The socket is provided with the usual flange 36 having a slot 37 to accommodate the clamping bolt 38 attaching the clip to the base 19.

In Fig. 5 I show an alternate form of clip. In this case the socket 40 is formed of a strip of metal bent into a cylindrical shape having a horizontal slot 41 separating the stem into lower and upper arms 42 and 43, and these arms are divided by a vertical slot 44, thus forming a resilient socket. A plurality of knubs 45 is formed in the back section 46 opposite the vertical groove 44. The foot 47 of the clip is attached to the back section 46 and is provided with a slot 48 through which may extend a clamping bolt. When the same is inserted in a socket of this type, the knubs ride over or slide on the wedge slope of the threads and causes sufficient expansion of the socket to permit insertion of the stem with a rectilinear motion without rotation. The knubs, however, engage the shoulder portions of the stem and prevent withdrawal by a straight line motion. When the stem is rotated it is threaded either inwardly or outwardly relative to the socket.

Fig. 6 illustrates a stem 50 which has a cylindrical surface 51, that is, it is smooth and has no threads. This is provided with the severing notches 52 and the cylindrical stem is gripped in a resilient socket 53 of a clip 54. This clip is substantially the same as illustrated in Figs. 1, 2, and 3 except that the knubs are omitted. With a stem of this type the stem may be inserted or withdrawn from the socket by rectilinear motion of the stem and is gripped by friction. On account of the notches the stem may be cut or broken to the desired length.

In Fig. 7 I illustrate the clip of Fig. 5 this being shown in section, having a stem 55 threaded therein. This stem may be of the general type shown in Figs. 1 and 2 except that the threads may be ordinary type threads having an equal slope on both sides of the apices and roots of the threads. The threads are engaged by inwardly projecting knubs 45 so that the stem may be threaded in the socket. In Fig. 7 the cut of annular grooves has been omitted.

It will be noted that the knubs in the construction of Figs. 1, 2, 4, 5, and 7, being spaced apart longitudinally of the socket, will always engage different threads of the stem and thus afford a good grip of the stem whereby on inserting the stem the socket is evenly expanded at its upper and lower portions and these knubs may be spaced whereby a plurality of shoulders of the thread may be engaged by the two knubs.

In breaking the refractory stems to obtain the proper length it is frequently the practice to adjust one stem to the proper length and then break all of the stems required for a particular job to the same length. Thus, the grooves 25 of Fig. 4 and 52 of Fig. 6 facilitate the breaking or cutting to proper length of a large number of stems.

Various changes may be made in the details of construction without departing from the spirit or scope of the invention as defined by the appended claims.

I claim:

1. A neon tube support comprising, in combination, a refractory stem having a head with means to contact a neon tube, threads of constant pitch on the outside of the stem and integral therewith extending from the end opposite the head, each thread having a gradual sloping wedging surface facing away from the head and also having an abrupt shoulder considered substantially transverse to the stem, an expandible socket having a plurality of knubs spaced apart lengthwise of the socket, the said knubs engaging the threads and on forcing the stem into the socket by rectilinear motion, the wedge surfaces forcing the knubs outwardly for insertion of the stem, the said knubs being adapted to engage the shoulder of the threads and prevent removal of the stem by rectilinear motion, the said knubs being operative to thread the stem into or out of the socket on rotation of the stem, the stem having a plurality of annular grooves spaced apart longitudinally of the stem by a plurality of threads, the grooves being adapted to facilitate severing a section of the stem and the knubs being spaced apart longitudinally whereby one knub always engages the threads.

2. In a neon tube support, a clip having a socket formed with a band portion on a cylindrical curve with projecting ends substantially tangent to the curve, said ends each having a longitudinal slot, a resilient strap having a portion curved on a cylindrical curve and with ends extending through the said slots and bent into contact with the tangent section of the band.

3. A neon tube support as claimed in claim 2, the band portion of the socket having a plurality of inwardly pressed knubs spaced longitudinally apart combined with a refractory supporting stem having threads engaged by the knub, said stem having a plurality of annular grooves spaced apart longitudinally of the stem by a plurality of threads, the grooves being adapted to facilitate severing a section of the stem, and the knubs being spaced apart longitudinally whereby one knub always engages the threads.

4. A neon tube support comprising, in combination, a refractory stem having a head with means to contact a neon tube, threads extending from the end opposite the head, an expansible socket having a plurality of knubs, said knubs engaging the threads, the stem having a plurality of annular grooves spaced apart longitudinally of the stem by a plurality of threads, the grooves being adapted to facilitate severing a section of the stem, and the knubs being spaced apart longitudinally whereby one knub always engages the threads.

5. In a neon tube support, the combination of a tubular socket having a relatively stiff back portion and relatively flexible forward portions connected thereto in a resilient manner, the back and the forward portions having inside surfaces forming at least part of a cylinder, the back portion having an inwardly projecting thread engaging means, a stem having a head with a neon tube engaging means, the stem having threads of equal pitch thereon, each thread having a sloping wedging surface extending outwardly from the end opposite the head and having an abrupt shoulder substantially transverse to the axis of the stem whereby, when the stem is inserted in the socket by a non-rotating rectilinear motion the thread engaging means on the stiff portion of the socket when engaging a wedging surface of a thread causes a lateral movement of the stem away from the stiff portion of the socket causing the flexible portions of the socket to expand outwardly, the thread engaging means on the socket engaging a shoulder of the thread on the stem then preventing removal of the stem except by a rotatable unscrewing motion, the stem being readily frangible and having a plurality of grooves cut deeper than the base of the threads, the grooves being spaced apart by a plurality of threads, the thread engaging means extending longitudinally of the stiff portion of the socket, the spacing being proportionate to the spacing of the grooves whereby at least one thread engaging means always engages a thread of the stem and whereby, when the stem is being inserted in the socket a portion of the cylindrical surface of the socket engages the apices of a plurality of threads and thus holds the same in a firm position relative to the socket.

A. B. McMAHAN.